United States Patent [19]
Huang

[11] Patent Number: 6,062,790
[45] Date of Patent: May 16, 2000

[54] COUNTERSUNK HOLE REINFORCING STRUCTURE

[75] Inventor: Meng-Chou Huang, Hsin-Tien, Taiwan

[73] Assignee: First International Computer, Inc., Taipei, Taiwan

[21] Appl. No.: 09/346,907

[22] Filed: Jul. 2, 1999

[51] Int. Cl.[7] .............................. F16B 33/00; F16B 43/00
[52] U.S. Cl. ............................ 411/531; 411/107; 411/368
[58] Field of Search ...................... 411/107, 399, 411/368, 369, 533, 531, 545; 52/410, 512

[56] References Cited

U.S. PATENT DOCUMENTS

| | | | |
|---|---|---|---|
| 4,757,661 | 7/1988 | Hasan | 411/533 X |
| 4,862,664 | 9/1989 | Romine | 52/410 |
| 5,673,920 | 10/1997 | Mockenhaupt | 411/533 X |

*Primary Examiner*—Neill Wilson
*Attorney, Agent, or Firm*—Rosenberg, Klein & Lee

[57] ABSTRACT

A countersunk hole reinforcing structure, which includes a plate member having a countersunk hole formed of a circular recess and a screw hole at the center of the circular recess for the installation of a screw bolt to fix the plate member to an object below, wherein the plate member has a plurality of reinforcing ribs raised from the circular recess and equiangularly spaced around the screw hole to reinforce the structural strength of the wall body of the circular recess.

1 Claim, 2 Drawing Sheets

COUNTERSUNK HOLE REINFORCING STRUCTURE

BACKGROUND OF THE INVENTION

The present invention relates to a countersunk hole reinforcing structure, in which the wall body of the top recess of the countersunk hole is reinforced by reinforcing ribs.

When fastening a plate member to an object by screw bolts, countersunk holes may be provided at the plate member for the mounting of screw bolts. However, when a countersunk hole is made, the wall thickness is relatively reduced at the countersunk hole, and the wall body of the top recess of the counter sunk hole tends to be damaged during installation of the screw bolt.

SUMMARY OF THE INVENTION

The present invention eliminates the aforesaid problem. According to one aspect of the present invention, a plate member is provided having a countersunk hole formed of a circular recess and a screw hole at the center of the circular recess for the installation of a screw bolt, and a plurality of reinforcing ribs raised from the circular recess around the screw hole to reinforce the structural strength of the wall body of the circular recess. According to another aspect of the present invention, the reinforcing ribs each have a chamfered guide edge for guiding the screw bolt into position, enabling the head of the screw bolt to be embedded in the circular recess.

DETAILED DESCRIPTION OF THE PREFERRED EMBODIMENT

Figure 1:
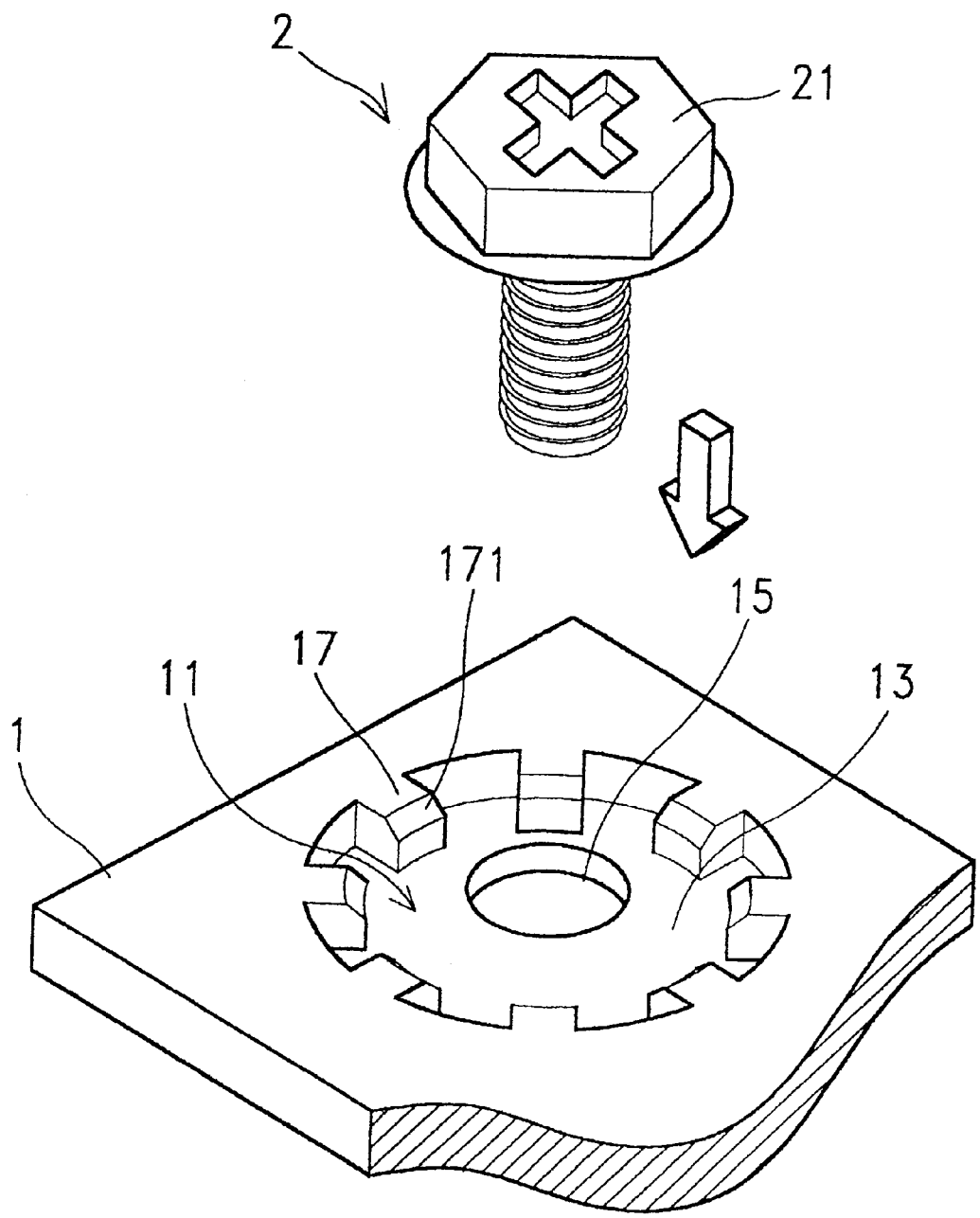
FIG 1 is a perspective view of the present invention.

Referring to FIG. 1, a plate member 1 is shown having a countersunk hole 11 for the fastening of a screw bolt 2. The countersunk hole 11 is formed of a circular recess 13 and a screw hole 15 at the center of the circular recess 13. The plate member 1 further comprises a plurality of reinforcing ribs 17 formed integral with the top side wall of the circular recess 13, and equiangularly spaced around the screw hole 15.

Figure 2:
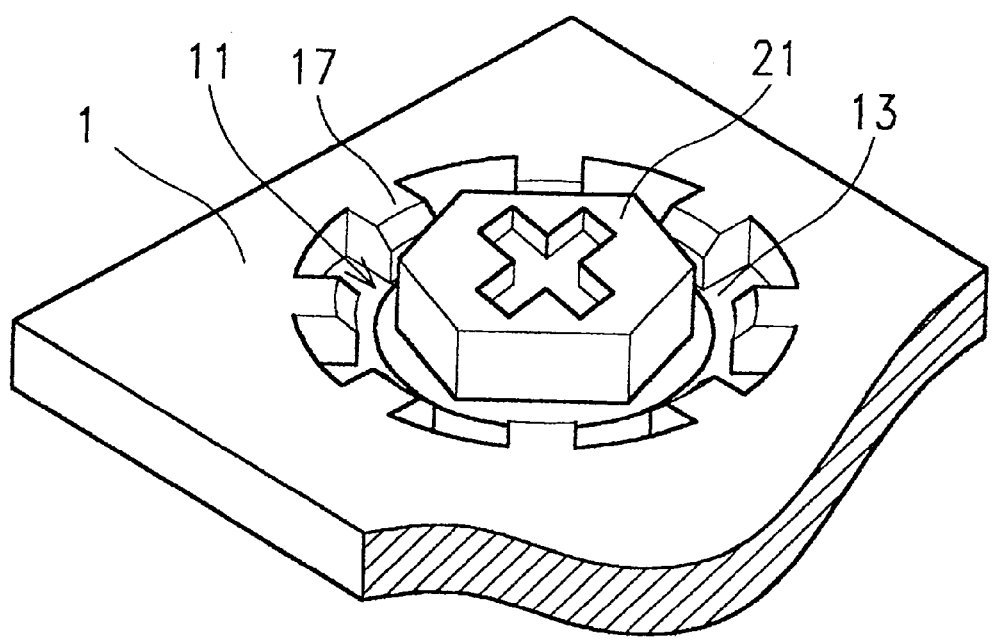
FIG. 2 is an oblique top view of the present invention, showing the screw bolt installed in the countersunk hole.
Figure 3:
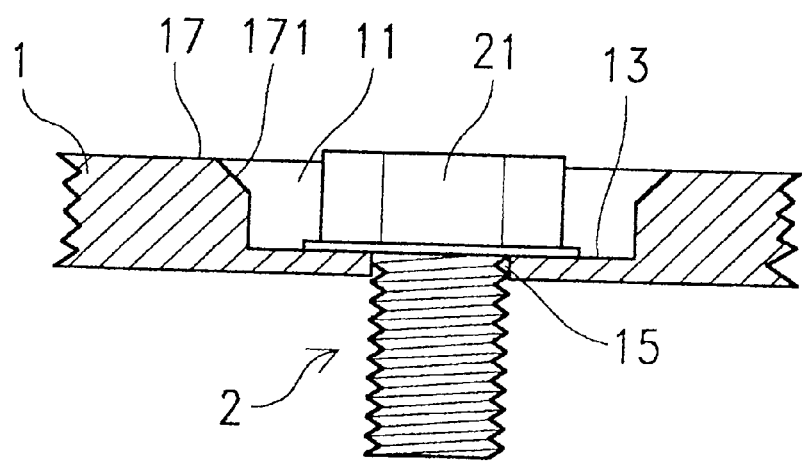
FIG. 3 is sectional side view of FIG. 2.

Referring to FIGS. 2 and 3, the screw bolt 2 is mounted in the countersunk hole 11 and fastened to an object below the plate member 1. When installed, the head 21 of the screw bolt 2 is embedded in the circular recess 13 of the countersunk hole 11 in flush with the top side wall of the plate member 1, and surrounded by the reinforcing ribs 17. Because the reinforcing ribs 17 are formed integral with the top side wall of the circular recess 13, the structural strength of the circular recess 13 is reinforced, and the installation of the screw bolt 2 does not damage the wall structure of the circular recess 13. Further, the reinforcing ribs 17 each have a chamfered guide edge 171 for guiding the screw bolt 2 into position.

Because the reinforcing ribs 17 reinforce the structural strength of the plate member 1, downward pressure from the screw bolt 2 is distributed in all direction through a single point to a plane at the circular recess 13 when fastening up the screw bolt 2, therefore the circular recess 13 is strong enough to bear downward pressure from the screw bolt 2 and does not break easily.

It is to be understood that the drawings are designed for purposes of illustration only, and are not intended for use as a definition of the limits and scope of the invention disclosed.

What is claimed is:

1. A reinforcing structure for a countersunk hole comprising a plate member having a circular recess formed in an upper surface thereof with a centrally located screw hole formed through a bottom wall of said recess for receiving a bolt therein, said plate member having a plurality of equiangularly spaced ribs extending radially from a perimeter wall of said recess, each of said plurality of ribs having a first radially extended portion adjacent said perimeter wall with an upper surface being coplanar with said upper surface of said plate member and a second radially extended portion radially spaced from said perimeter wall having an inclined upper surface extending from said coplanar surface to define a chamfered distal end portion of said rib.

\* \* \* \* \*